Jan. 29, 1952 H. W. HOFFMAN ET AL 2,583,737

PHOTOELECTRIC RECORDING DEVICE

Original Filed Sept. 6, 1943 4 Sheets-Sheet 1

INVENTORS
Harry William Hoffman
Grover H. Helmer
By Paul, Paul & Moore
ATTORNEYS Jan. 29, 1952 H. W. HOFFMAN ET AL 2,583,737

PHOTOELECTRIC RECORDING DEVICE

Original Filed Sept. 6, 1943 4 Sheets-Sheet 2

INVENTORS
Harry William Hoffman
Grover H. Helmer
By Paul, Paul & Moore
ATTORNEYS INVENTORS
Harry William Hoffman
Grover H. Helmer
By Paul, Paul + Moore
ATTORNEYS Jan. 29, 1952 H. W. HOFFMAN ET AL 2,583,737

PHOTOELECTRIC RECORDING DEVICE

Original Filed Sept. 6, 1943 4 Sheets-Sheet 4

INVENTORS
Harry William Hoffman
Grover H. Helmer
By Paul, Paul & Moore
ATTORNEYS Patented Jan. 29, 1952 2,583,737

UNITED STATES PATENT OFFICE 2,583,737

PHOTOELECTRIC RECORDING DEVICE

Harry William Hoffman, Anoka, Minn., and Grover H. Helmer, deceased, late of St. Louis Park, Minn., by Esther Helen Helmer, special administratrix, St. Louis Park, Minn., assignors to Federal Cartridge Corporation, Minneapolis, Minn., a corporation of Minnesota Original application September 6, 1943, Serial No. 501,424. Divided and this application April 28, 1947, Serial No. 744,524

6 Claims. (Cl. 346—38)

This invention relates to an apparatus for accurately and automatically indicating and recording movements of illuminated or light-reflective bodies past a station or plurality of stations in succession, and particularly to sensitive photo-electric apparatus for indicating and recording the operation of illuminated projectiles.

The invention has particular applicability where it is desired to indicate and record the performance of illuminated or illuminatible and reflective bodies in their movement past one or more stations. It is, therefore, an object of the invention to provide such an apparatus for indicating and recording the movement of projectiles, and particularly by photo-electric means. It is also an object of the invention to provide a photo-electric viewing and amplifying apparatus together with indicating or recording apparatus of extreme sensitivity capable of being operated by exceedingly small changes in light density during instantaneous periods, and particularly to provide such an apparatus capable of use where the available power supply is relatively poorly regulated and is subject to frequent instantaneous variations in voltage.

Other and further objects of the invention are those inherent and implied by the apparatus herein illustrated, described and claimed.

Throughout the drawings, corresponding numerals denote corresponding parts. The apparatus is illustrated with respect to the drawings in which Figure 1 is a schematic plan or elevational view of the entire system;

This application is a division of application Serial No. 501,424 filed September 6, 1943, now Patent 2,442,690, issued June 1, 1948.

Figure 1:
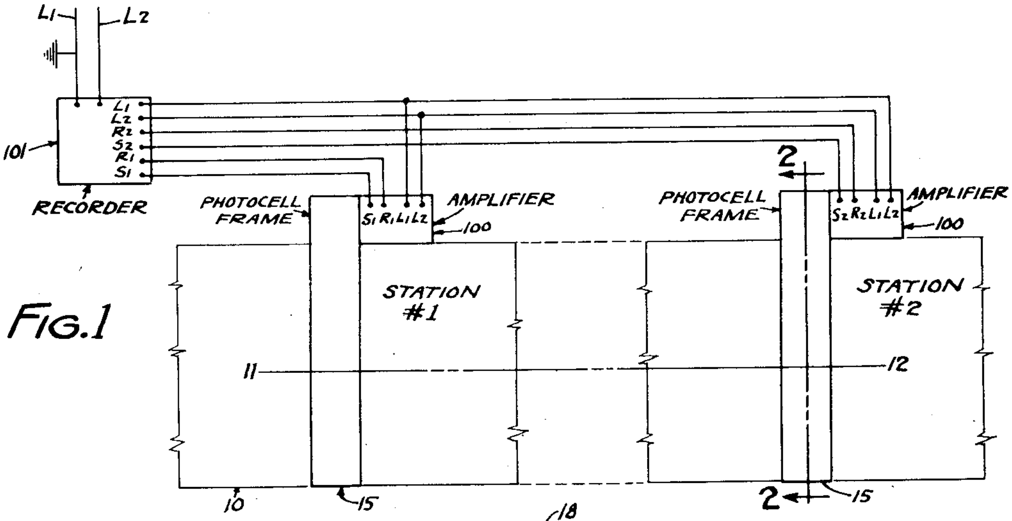

Referring to Figure 1, there is illustrated a range generally designated 10, along which an object such as a projectile is adapted to pass as, for example, along the path of line 11—12. At one or more places along the range there are established stations for indicating and providing responsive electrical signals as a result of the passage of a projectile or other object past the station. Thus, along the range 10 there are illustrated station 1 and station 2, although it will be understood that in other installations it may be desirable to use more than two stations, depending upon the work to be done.

Figure 3:
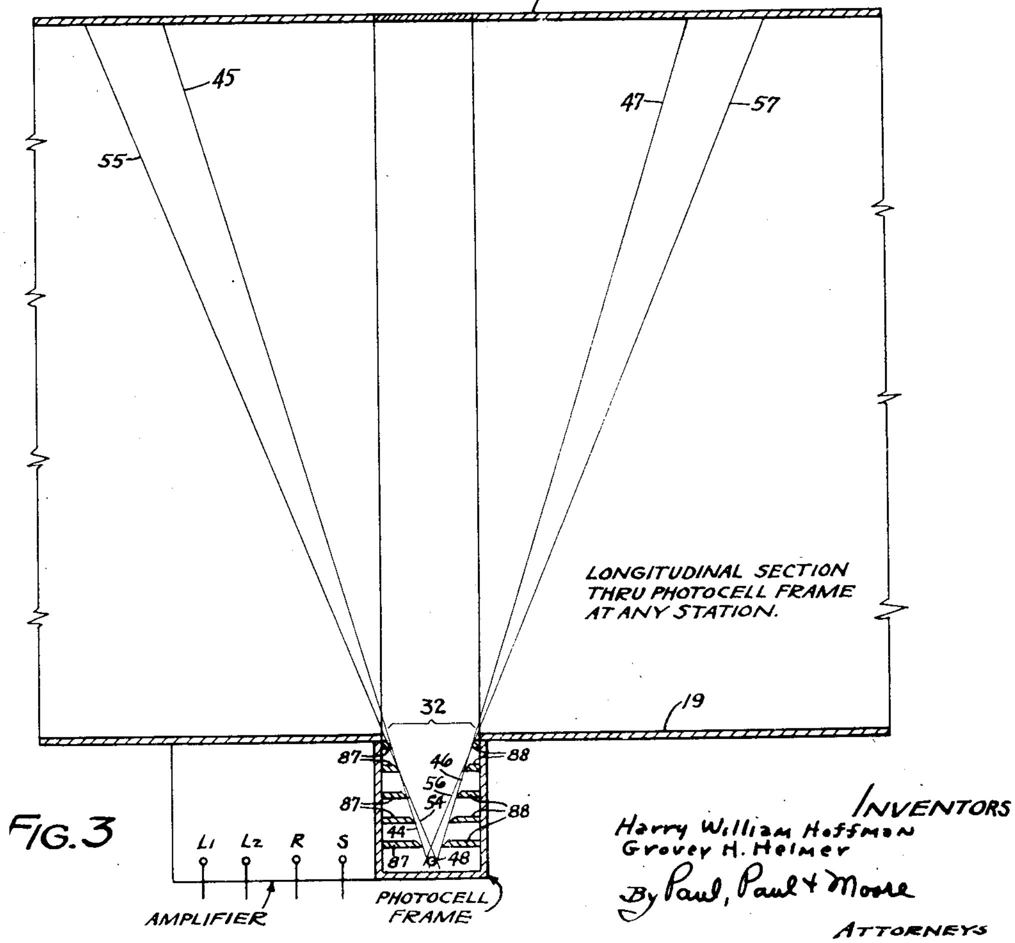
Figure 3 is a longitudinal, sectional view through either of the photo-electric cell stations of the system and taken in the direction of arrows 3—3 of Figure 2.
Figures 2, 4:
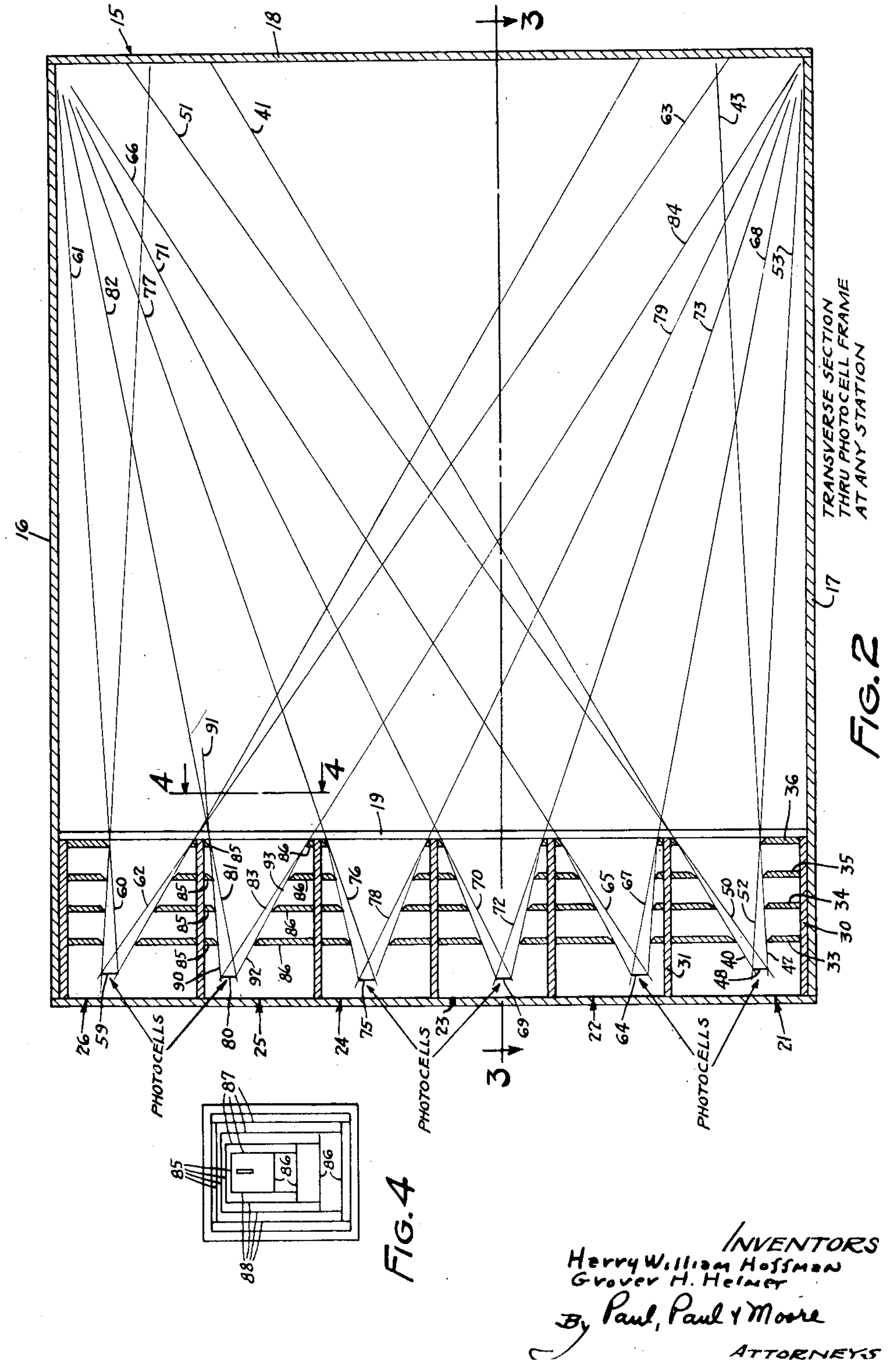
Figure 2 is a sectional view through one of the photo-electric stations shown at Figure 1 and taken in the direction of arrows 2—2 of Figure 1.
Figure 4 is a front, elevational view of one of the photo-electric devices of Figure 2 taken in the direction of arrows 4—4 of Figure 2.

Stations 1 and 2 and any additional stations which may be utilized in the system are preferably of identical construction and each includes a photo-electric cell frame generally designated 15, having the general configuration illustrated in Figures 2, 3 and 4, although, obviously, this mechanical framework may be widely varied in accordance with the particular installation. For purposes of illustration herein it is assumed that it is desired to record the passage past Stations 1 and 2 of an illuminated or illuminatible projectile, and that the projectile is moving at gunfire velocity. In such a system the photo-electric cells are conveniently housed in a framework generally designated 15, having top members 16, bottom members 17 and side members 18 and 19 defining the cross-sectional space of the range through any portion of which the projectile may pass. Adjacent to the side member 19 there are positioned a plurality of photo-electric cell-enclosing boxes generally designated 21, 22, 23, 24, 25 and 26 of generally similar, but not identical construction. Thus, in the specific embodiment illustrated, there are six boxes, 21 and 26 being identical, 22 and 25 being identical and 23 and 24 being identical. However, the boxes 21, 22 and 23 are arranged in transposed position with respect to boxes 24, 25 and 26. More specifically, it will be noted that box 21 has top and bottom walls 30 and 31 which extend forwardly to the vertical wall 19. The vertical wall 19 is composed of one or more vertically spaced panels, having a space therebetween so as to form a vertical viewing aperture, as illustrated at the bracket 32 in Figure 3.

Within the box 21 there are a plurality of baffles 33, 34, 35 and 36, each of which has an opening cut centrally therein. The openings of the several baffles are chamfered at the edge toward the right in Figure 2 (i. e. toward the light) and the openings are of such a size that their edges define a cone of view bounded (in the case of box 21) by the lines 40—41, 42—43 (in the sectional view shown in Figure 2), and the lines 44—45 and 46—47 (in the sectional view shown in Figure 3). At the position indicated by numeral 48 within box 21, there is positioned a photo-electric cell mounted in any suitable manner not illustrated. Hence, any light falling within the angle of view defined by lines 40—41 and 42—43 (in the sectional view shown in Figure 2) and any light falling within the angle of view defined by the lines 44—45 and 46—47 (in the sectional view shown in Figure 3) is free to fall uniformly on any portion of the photo-electric cell cathode. Due to the finite width and height of the photo-electric cell 48 cathode, there is a marginal area around the cone of view in which any light will illuminate part but not all of the photo-electric cell. This marginal area lies between the lines 40—41 and 50—51 at the upper portion of Figure 2, and between the lines 42—43 and 52—53 at the lower portion of Figure 2. Similarly, there is a marginal area between the lines 46—47 and 56—57 at the right, as shown in Figure 3, and between the lines 44—45 and 54—55 at the left, as shown in Figure 3.

The photo-electric cell box 26 is identical with that shown at 21 except that it is inverted, the outer limits of the field of view of photocell 59 of box 26 being illustrated by lines 60—61 and 62—63 in the section shown in Figure 2. As shown in Figure 3, the limits of view of all of the photocells are identical for the direction shown in Figure 3, since the cells are mounted one over the other.

The photo-electric cell boxes 22, 23, 24, 25 and 26, are constructed similarly to box 21, except that the baffling is so arranged as to allow cones of view defined as follows: For the photo-electric cell 64 of box 22, the outer limitations of the cone of view are defined by lines 65—66 and 67—68. The cone of view of photo-electric cell 69 of box 23 is defined by lines 70—71 and 72—73. The cone of view of photo-electric cell 75 of box 24 is defined by lines 76—77 and 78—79. The cone of view of photo-electric cell 80 of box 25 is defined by the line 81—82 and 83—84.

It will be observed that the intermediate photo-electric cells 64, 69, 75 and 80 thus have cones of view extending throughout the total vertical area adjacent side wall 18, whereas photo-electric cells 48 and 59 of the bottom box 21 and top box 26, respectively, have cones of view which do not reach throughout the entire side wall area 18. As will later be explained, all the photo-electric cells act in parallel and the cumulative effect of the arrangement shown is that a light source of given luminosity moving along any area bounded by walls 16, 17, 18 and 19, produces approximately the same net electrical response except in the small upper area between top wall 16 and the line 60—61 and the small lower area between bottom wall 17 and the line 52—53, these areas being considered as outside the practical range of movement of the illuminated source. Thus, a projectile moving throughout the range along any path normal to the plane of Figure 2 and through the right-hand portion of Figure 2 will serve to activate all or nearly all of the photo-electric cells, whereas a projectile within the upper and lower reaches and to the left (adjacent wall 19) of Figure 2 serves to activate only a select few of the cells. However, being closer to the cells, the degree of activation is greater and hence the response is approximately as much as when the projectile is to the far right, as shown in Figure 2, and hence within the cone of view of a greater number of cells.

Figure 4 illustrates the front view of a representative one of the photo-electric cell housings, for example that shown at 25. The horizontal baffling plates 85 and 86 and vertical side baffling plates 87 and 88 cut off stray light. Thus, the top horizontal baffling plates 85 are arranged so as to lie along the line 90—91, the horizontal lower baffling plates 86 are arranged so that their edges lie along the line 92—93. The vertical baffling plates 87 are arranged so that their edges lie along the line 44—45 (Figure 3) and the opposite vertical plates 88 have vertical edges lying along the line 46—47 shown in Figure 3. The corresponding baffling plates of the remaining photo-electric cell boxes 21, 22, 23 and 26 are arranged as shown in Figures 2 and 3. The entire interior of the photo-electric cell boxes, the baffles and the interior of the range are finished a dead black so as to absorb any stray light.

At each photo-electric cell station (of which there are two illustrated in Figure 1) there is an amplifier apparatus generally designated 100. These amplifiers are preferably identical and hence only one need be described. The amplifier shown in Figure 1 is provided with two power supply lines $L_1$ and $L_2$ and a signal line $S_1$ and a reset line $R_1$ for the amplifier at station 1. The signal line is designated $S_2$ and a reset line is designated $R_2$ for the amplifier at station 2. The signal lines $S_1$ or $S_2$ and the reset lines $R_1$ or $R_2$ are connected to the recorder generally designated 101, illustrated in Figure 1. The amplifier power supply lines $L_1$ and $L_2$ of each emplifier are connected in parallel and are wired throughout the recorder so as to allow control of the entire system from the recorder as hereinafter explained.

Figure 5:
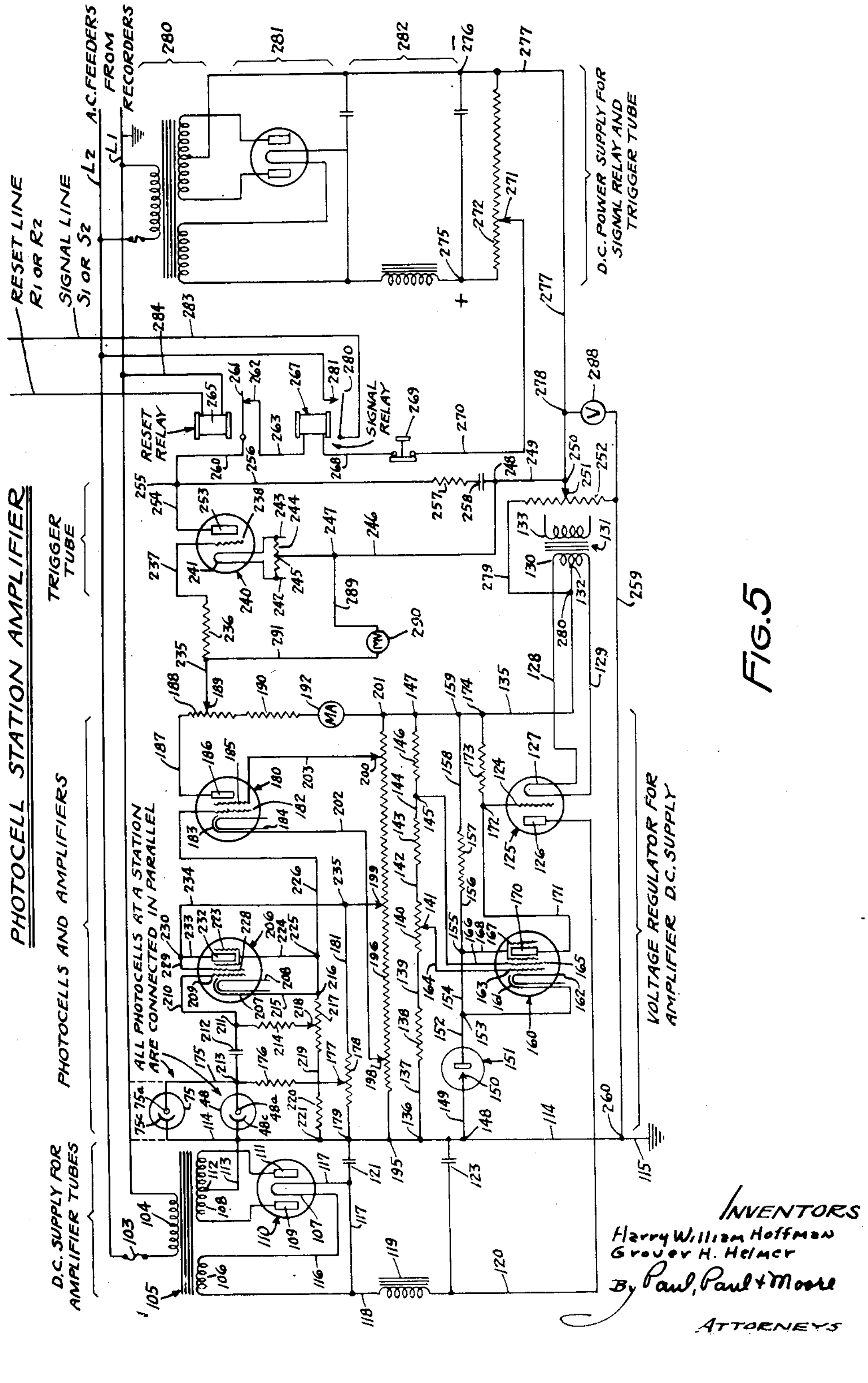
Figure 5 is an electrical wiring diagram of an amplifier circuit such as is used in each photo-electric station.

In Figure 5 there is illustrated an exemplary diagram of an amplifier suitable for use at stations 1 or 2 or any other additional stations that may be used in the system. The alternating current feeders $L_1$ and $L_2$ of the amplifier are connected through a suitable fuse 103 to the primary 104 of a transformer generally designated 105. The transformer is provided with a secondary 106 of suitable voltage for supplying energy to the filament 107 of a full-wave rectifier tube generally designated 110, and another secondary 108 is connected across the plates 109 and 111 of the rectifier tube. The mid-point 112 of the transformer secondary 108 is connected by line 113 to line 114, the latter being grounded at 115. Plates 109 and 111, being thus alternately negative, feed the grounded negative line 114 of the system. The filament 107 of the rectifier tube is connected through lines 116 or 117 to line 118 and thence through choke coil 119 to feeder 120, which constitutes the positive output of the rectifier circuit. Line 118 is connected through condenser 121 to ground line 114, and line 120 is likewise connected through condenser 123 to a ground line. The two condensers 121 and 123 and the choke coil 119 thus serve as a filter network for smoothing out the pulsating current output of the rectifier. The transformer 105, rectifier 110 and filter network 119—121—123 thus constitute a direct current supply for the amplifier tubes of the system, and in Figure 5 these parts of the apparatus have been bracketed and so designated.

The system also includes a voltage regulator for the amplifier direct current supply, the regulator being over the bracket bearing that notation. To accomplish such regulation, the positive feeder 120 is connected directly to the plate 126 of thermionic tube generally designated 125. The filament 127 of tube 125 is connected through lines 128 and 129 to the secondary 130 of transformer generally designated 131, which is suitably energized by a primary winding 133. The mid-point 132 of the transformer secondary 130 is connected to line 135 which constitutes the regulated positive voltage feeder of the thermionic tube hereinafter described.

The regulator portion of the apparatus also includes the following components and circuits: From junction 136 on line 114 there extends a potentiometer circuit consisting of line 137, resistor 138, line 139, resistor 140 having an adjustable tap 141, thence through line 142, resistor 143, line 144 having junction 145 thereon, and thence through resistor 146 to junction 147 on line 135. In parallel with the aforesaid potentiometer resistor, there is connected a circuit extending from junction 148 on line 114 through line 149 which is connected to the cold cathode 150 of a gas-filled regulator tube generally designated 151, and thence through line 152, junction 153, line 154, junction 155, line 156, resistor 157 and line 158 to junction 159 on line 135. The regulator apparatus also includes a thermionic tube generally designated 160 having a cathode emitter 161 indirectly heated by filament 162 which is connected to any suitable filament voltage source. A first grid 163 is connected through line 164 to the adjustable tap 141 on resistor 140. A second grid 165 is connected through line 166 to junction 145 between resistors 143 and 146. A screen grid 167 is connected through line 168 to junction 155 between lines 154 and 156. The plate 170 of the tube 160 is connected through line 171, through junction 172 and thence through resistor 173 to junction 174 on the regulated positive voltage feeder 135.

The operation of the voltage regulator portion of the system is as follows:

In the event an increase of voltage occurs on alternating current feeders $L_1$ and $L_2$, this is reflected as an increase of voltage either permanent or transient in the direct current tube of full-wave rectifier tube 110. Since the direct current output of the rectifier tube 110 is communicated to the positive voltage feeder 135 through the thermionic tube 125, it follows that the direct current potential applied to line 135 is dependent upon the degree of conductivity of the tube 125 which is in turn under control of its grid 124. The voltage upon grid 124 is determined by the relative values of resistor 173, the resistance from plate 170 to the cathode 161 of the tube 160. Whenever an increase of voltage occurs on line 120, it is desired to suppress this voltage in part before being applied to line 135, and in order to accomplish this function, the resistance of tube 125 is accordingly increased by making the grid 124 more negative than during conditions of normal voltage. This more negative condition of grid 124 is accomplished by reducing the resistance of tube 160. The reduction of resistance is accomplished by the fact that an increase of voltage at 135 causes practically no increase of voltage at junction 153 due to the characteristics of tube 151 (variable resistance characteristic). However, an increase of voltage at 135 does cause an increase of voltage at junction 141. Thus, the grid 163 is charged in a positive direction with respect to cathode 161 causing a reduction in the resistance of tube 160; and as a result the grid 124 of tube 125 becomes relatively more negative than during normal operation, thus compensating the increase of voltage of the source. For the optimum operation of tube 160, it is desirable to connect the screen grid 165 to tap 145, and thereby maintain a somewhat positive voltage on grid 165. The suppresser grid 167 is maintained at the same potential as the cathode emitter 161 via connection 154.

Wherever there is available an alternating supply source, substantially free from voltage fluctuation, the voltage regulator may be omitted and the output of rectifier 110 connected directly across feeders 114—135. However, in usual commercial installations the connection of even relatively small loads causes transient voltage fluctuations, and as these are sufficient to cause false indications, we have found it necessary to use the voltage regulator apparatus in order to have proper, fault-free functioning of this very sensitive apparatus.

There are six photo-electric cells, viz. 48, 59, 64, 69, 75 and 80 illustrated in Figure 2, but for simplicity only two of the photo-electric cells are shown in Figure 5, these being cell numbers 48 and 75. It will be understood that the remaining photo-electric cells are connected in parallel. As illustrated in Figure 5, the cathodes 48–C and 75–C of the photoelectric cells are connected to the grounded negative line 114, whereas the anodes 48–A and 75–A are connected in parallel to photo-electric cell output line 175, which is in turn connected through a resistor 176 to a variable tap 177 on resistor 178. Resistor 178 is connected to ground line 114 at junction 179, and the opposite end of the resistor is connected through line 181 to junction 235 on line 234 and thence through line 234 to variable tap 199 on resistor 196. The thermionic tube 180 constitutes the second stage amplifier of the amplification and includes a cathode emitter 183 which is indirectly heated by filament 184, the filament being connected to any suitable source. The plate 186 of the tube 180 is connected through line 187, resistor 188 (having a variable tap 189), thence through resistor 190 and milliammeter 192 to the regulated positive feeder 135. From conjunction 195 on grounded negative feeder 114 there extends a potentiometer resistor generally designated 196 having variable taps 198, 199 and 200 thereon, the opposite end of resistor 196 being connected to junction 201 on the regulated positive feeder 135. Due to the voltage applied across the potentiometer resistor 196, there is accordingly established steady voltages at taps 198, 199 and 200. Tap 198 is connected through line 202 to the cathode emitter 183 of tube 180, and tap 200 is connected through line 203 to screen grid 185 of thermionic tube 180.

The first stage amplifier tube generally designated 206 includes a cathode emitter 207 which is indirectly heated by a suitable energized filament 208. The control grid 209 of the tube is connected through line 210, through junction 211 and capacitor 212 to junction 213 on the photo-electric cell anode circuit 175. The cathode emitter 207 is connected by line 215 to junction 216, and thence through resistor 217 having a variable tap 218 and through line 219 and resistor 220 to tap 221 on the grounded negative feeder 114. The suppresser grid 223 of tube 206 is connected by line 224 to junction 225 and thence through line 226 to junction 216 on the cathode circuit. Line 226 is connected directly to the control grid 182 of the second stage amplifier tube 180. Screen grid 228 of the tube 206 is connected through line 229 to junction 230, to which the plate 232 of the tube 206 is also connected by line 233. From junction 230 on the plate circuit there extends a line 234 which is connected at junction 235 to line 181 extending through resistor 178 to the negative feeder 114.

The output of the second stage amplifier is at junction 189 on resistor 188 from which extends a circuit leading through line 239 and resistor 236 and thence through line 237 to a control grid 238 of a gas-filled trigger tube generally designated 240. The trigger tube 240 includes a filament 241 which is suitably fed by alternating current through the filament feed wires 242 and 243. A resistor 244 is connected across the filament feed wires, and the mid-point 245 of the resistor is connected through line 246, having junction 247 thereon, to junction 248, and thence through line 249, junction 250, variable tap 251 and resistor 252 to ground line 259.

The output of trigger tube 240 is by way of a circuit extending from plate 253, line 254, junction 255, line 260, thence through normally closed contacts 261 and 262 of a reset relay 265, through line 263, through the winding of a signal relay 267, which is the operated instrumentality, then through line 268, normally closed, manually operated switch 269, line 270, through variable resistor 271—272 to the positive terminal of a separate rectifier and filter network 280—281—282. The output circuit continues from the negative output terminal 276 of the rectifier through line 277 to junction 250, thence through line 249, junction 248, line 246, resistor 244 to filament 241 of the tube 240. The plate of the trigger tube is connected to the filament by a circuit extending from junction 255 on the plate circuit, line 256, resistor 257, capacitor 258, through junction 248, line 246, resistor 244 to the filament 241.

The grid 238 of the trigger tube has a potential established by the output of tube 180. The potential applied to the grid 238 of the trigger tube may have a definite value in reference to ground. The output circuit of the trigger tube is connected at junction 255 to variable tap 251 on resistor 252, it being noted that one end of resistor 252 is grounded to line 259 and that the other end of the resistor 252 is connected to the voltage regulated positive feeder 135 of the amplifier system. Thus, the output of second stage amplifier tube 180 establishes a potential gradient from plate 186, through resistor 188, resistor 190, thence to the voltage regulated positive feeder 135, and then the latter is connected through resistor 252 to the grounded negative of the system. Accordingly, as the voltage of tap 189 varies, grid 238 of the trigger tube has a definite voltage of reference with respect to the filament 241 of the trigger tube.

*Operation of station amplifier*

It is assumed that the alternating current feeders $L_1$ and $L_2$ are energized and that rectifier 105—110 and rectifier 280—281—282 are operating. It is also assumed that the photo-electric cells 48—75 are dark and are consequently of high resistance value. Under such conditions amplifier 206 and 180 are conductive and the following conditions prevail: Current flows from positive supply line 135, from tap 201, through the potentiometer resistor 196 to tap 195 on the grounded negative supply line 114. From intermediate voltage tap 199 on the potentiometer resistor 196 a circuit is established through line 234 to plate 232 and thence to cathode 207 (of tube 206), and through resistor 217, line 219 and resistor 220 to tap 221 on the grounded negative feeder 114. The current flowing in this circuit establishes an intermediate positive potential at tap 218 on resistor 217, and this is communicated through a resistor 214 to junction 211 on the grid connection 210 of tube 206, thereby establishing a positive potential on the control grid 209 of the tube.

An intermediate positive potential is also communicated from cathode 207 of the first stage amplifier to the grid 182 of the second stage amplifier 180 and the latter tube is conductive. This condition of both tubes being conductive continues so long as the photocells are maintained at a given degree of darkness.

When light falls upon the photo-electric cells they become somewhat conductive, and accordingly serve to drain off the electrical charge normally accumulated on line 210, the drain being through the circuit extending from junction 211, capacitor 212 to junction 213, and thence through the photo-electric cell (or cells) to the grounded negative supply line 114. The consequent decrease in positive voltage of grip 209 of tube 206 renders tube 206 less conductive and as a result, less current flows through the plate circuit of the tube. As previously explained, the plate circuit of tube 206 traverses resistor 217, and the normal plate current flowing when the photocells are dark establish the grid potential of the amplifier. Hence, when the photocells are illuminated the first effect is to reduce the plate current through tube 206, and as this occurs, tap 218 of resistor 217 (which is in the plate circuit) tends to shift to the negative. As a result, there is less tendency for the positive potential of grid 209 to be re-established and the decrease in conductivity of the tube 206 is hence cumulatively effective in further decreasing the conductivity of the tube once the initiating impulse is received from the photo-electric cells.

Since the grid 182 of the second stage amplifier tube 180 is connected directly to the cathode of tube 206, any decrease in conductivity through tube 206 is immediately reflected on tube 180 which likewise becomes less conductive. The plate circuit of the tube 180 extends from tap 201 on the positive feeder 135 through the milliammeter 192, resistors 190 and 188, line 187, plate 186, through the tube 180 to cathode 183, through line 202 to tap 198 on the resistor 196, and thence through the resistor to tap 195 on the grounded negative supply line 114. The decrease in conductivity of tube 180 (which is equivalent to an increase of resistance of the tube) causes the potential of tap 189 to become more positive, and this positive impulse is communicated directly through lines 235, resistor 236 and line 237 to the grid 238 of the trigger tube 240. The impulse causes the latter tube to trigger off and begin to conduct.

The operation circuit of the trigger tube extends from the positive terminal 275 (of separate rectifier and filter 280—281—282), through resistor 272, terminal 271, line 270, normally closed manual reset switch 269, line 268, the coil grid of signal relay 267, line 263, normally closed contacts 262—261, of the reset relay 265, line 260, junction 255, line 254, to plate 253, thence through the trigger tube 240 to filament 241, through resistor 244 to the mid-point tap 245, thence through line 246 to junction 248, line 249, junction 250, line 277 to negative terminal 276 of the rectifier 280—281—282.

The circuit thus established through the trigger tube 240 causes the energization of relay 267 which closes its movable contact 280 upon its fixed contact 281, thus establishing a circuit from the alternating current feeder $L_2$, through the then closed contacts 280 and 281 to the signal line $S_1$ which serves to actuate the recorder, as hereinafter explained. The trigger tube 240 continues to conduct once ionization is established in the tube, and therefore in order to interrupt the circuit, there are provided normally closed contacts 261—262 of the reset relay generally designated 265. For opening these contacts a circuit is established at the recorder station, as hereinafter explained, from the alternating current feeder $L_2$ at the recorder station, through Reset line $R_1$ (or $R_2$) to the coil of relay 265 and thence through line 284 to line 1 at the station amplifier.

Upon energization of reset relay coil 265, contacts 261 and 262 are separated, thus interrupting the output circuit of the trigger tube 240. This allows relay 267 to become deenergized. If desired, the circuit through the trigger tube may be interrupted by manually operating the normally closed switch 269.

In order to calibrate the amplifier apparatus, a voltmeter 288 is provided between lines 277 and the ground line 259. A millivoltmeter 290 is connected across lines 246 and 235 and a milliammeter 192 is provided in the plate circuit of tube 180. By means of these instruments and the various adjustments provided, the apparatus may be adjusted for operation under any desired degree of light change on the photocells.

*Recorder and indicator*

The overall sensitivity of the system can also be varied by changing the voltage applied to the photocells, by varying the adjustment of tap 177 on resistor 178. A potential of 80 volts at point 177 gives good results; a reduction in voltage decreases the sensitivity of the system.

Figures 6, 7:
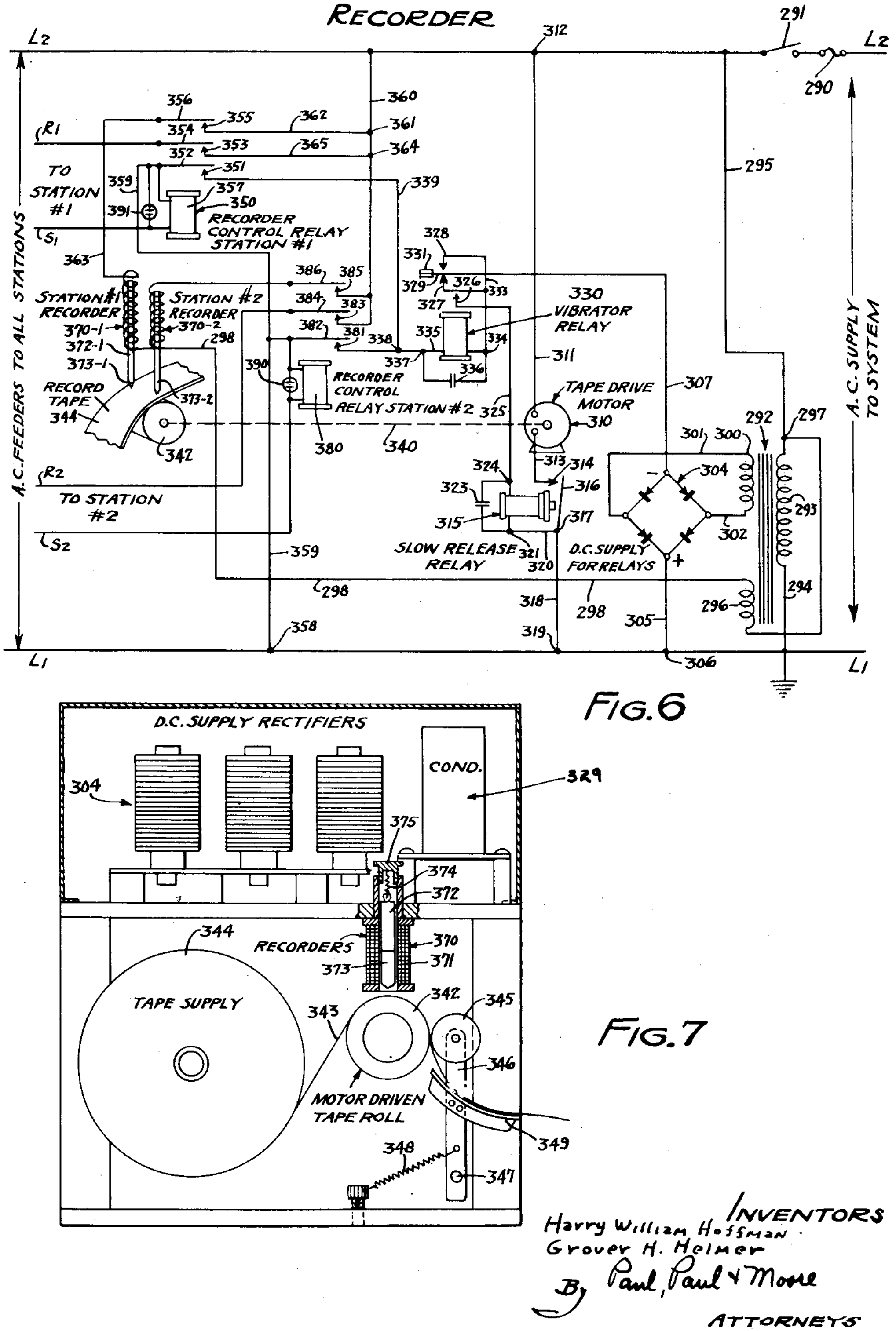
Figure 6 is a wiring diagram together with a schematic representation of the recorder apparatus of the system.
Figure 7 is an elevational view, partly in section, of a portion of the recording apparatus.

Referring to Figures 6 and 7, there is illustrated therein the circuit diagram and certain of the construction details of the recorder and indicator apparatus shown at the left in Figure 1. The recorder apparatus is provided with alternating current supply connections $L_1$ and $L_2$, $L_1$ being grounded, and $L_2$ being provided with a fuse 290 and a manually operated control switch 291. The lines $L_1$ and $L_2$ extend through the recorder and connections are made from the left ends of $L_1$ and $L_2$ of Figure 6 to each of the photo-electric cell station amplifiers, as illustrated in Figure 1. Accordingly, fuse 290 and switch 291 serve to control the entire system.

In the indicator and recorder mechanism there is provided a transformer generally designated 292, having a primary winding 293 connected by means of lines 294 and 295 to the alternating current feeders $L_1$ and $L_2$, respectively. The transformer is provided with a secondary winding 296 which is connected to line 295 at junction 297, and hence through line 295 to alternating current feeder $L_2$. The opposite terminal of winding 296 is connected to a secondary feeder 298 which serves to supply low voltage alternating current potential to the various portions of the apparatus. The transformer is also provided with secondary winding 300 which is connected through lines 301 and 302 to the alternating current terminals of the full-wave rectifier generally designated 304. The positive direct current terminals of the rectifier 304 are connected by line 305 to junction 306 on the grounded alternating current feeder $L_1$. The negative terminal of the rectifier 304 is connected to line 307 which serves as a direct current supply line to various portions of the apparatus.

The recorder apparatus includes a tape drive motor generally designated 310, one terminal of which is connected by means of line 311 to junction 312 on the alternating current feeder $L_2$. The opposite terminal of the tape drive motor 310 is connected by means of line 313 to stationary contact 314 of a slow release relay generally designated 315. A mechanical connection 340 extends from the motor 310 to a tape drive roll 342 and may include any suitable gearing so that the tape drive roll 342 is rotated at a desired slow or fast rate when the tape drive motor 310 is operated. Referring to Figure 7, the tape drive roll 342 serves to pull tape 343 from the tape supply roll 344. Tension is maintained upon the tape by means of an idler roller 345 which is held in contact with the motor-driven tape drive roll 342 by means of its mounting on arm 346. The arm 346 is pivoted at 347 and a spring 348 is attached thereto so as to cause the arm 346 to be pulled against the motor-driven tape drive roll 342, and thus any desired tension is maintained. The arm 346 is provided with a chute 349 along which the marked tape record slides from the machine.

The apparatus shown in Figure 7 also includes an illustration of the condensers generally designated 392 and several elements of the rectifier generally designated 304. Above the tape roll there are provided one or more recorder solenoids generally designated 370 having windings 371, one such recorder solenoid corresponding to each photo-electric station. The core of the solenoid includes an iron portion 372 and a brass stylus end 373, the core being spring mounted by means of spring 374 which is attached to the screw adjustment knob 375. Whenever the solenoid 370 is energized, the point of the stylus is brought into contact with the tape, thereby making a mark on the tape.

The slow-release relay 315 is provided with a movable contact 316 which is connected through junction 317 and line 318 to junction 319 on the grounded alternating current and positive direct current feeder $L_1$. From junction 317 there extends line 320 which is connected at junction 321 to the winding of relay 315 and also to one terminal of a condenser 323. The opposite terminals of winding of the relay 315 and condenser 323 are connected at junction 324 and thence through line 325 to contact 326 of the vibrator relay generally designated 330. The slow release relay 315 is capable of instantaneous pick-up, but will remain energized for a period of ¼ to 1 second after energization ceases, depending upon adjustment.

The vibrator relay 330 is provided with two active spring-mounted contacts 326 and 327, and inactive spring-mounted contact 328. A vibrator contact 329 is weighted at its outer end as shown at 331. In the condition of rest, the weighted, springy contact 329 is in engagement with the active contact 327, but during such condition of rest the contact 326 is separated slightly from contact 327. The contact 328 is not connected in the circuits shown, but serves as a mechanical counterpart of contact 327 so as not to de-tune the relay. Contact 327 is connected through line 333 to junction 334 from which connection is made through the winding of the vibrator relay 330 and through a condenser 336 in parallel, to junction 337 and thence through line 335 to junction 338. The springy, weighted contact 329 of the vibrator relay is connected directly to the negative output line 307 of the rectifier. From junction 338 connections are made in parallel to each of the recorder control relays corresponding to each recorder station in the system.

A recorder control relay is provided for each photocell amplifier station, and hence there are two recorder control relays in the herein illustrated system. Thus, there are provided a recorder control relay 350 (corresponding to station 1) and a similar recorder control relay 380 (corresponding to station 2).

Relay 350 is provided with contacts 351, 353 and 355 which cooperate respectively with movable contacts 352, 354 and 356, the movable contacts being out of engagement with their corresponding stationary contacts when the relay is de-energized. The winding 357 of the relay is connected to line 359 at contact 352 and to signal line $S_1$ extending to the photo-electric cell amplifier station number 1, the circuit through coil 357 thus being from $L_1$ at the recorder (Figure 6), thence through line 359, to contact 352, thence through winding 357 to line $S_1$ which continues to the amplifier station (Figure 5) through contacts 280 and 281 (when closed in response to a signal) and to feeder $L_2$ at the amplifier of station 1.

When coil 330 is energized, reed 329 is drawn toward the coil forcing contact 327 against contact 326. When the circuit through the coil is broken, reed 329 is released and continues to vibrate. "Snubbing" of the reed 329 is prevented by the positioning of the contacts as shown; for example, in the event the next impulse through the coil occurs when the position of reed 329 is out of contact with contact 328, no circuit is established through the coil, and reed 329 hence continues to vibrate.

The energization of coil 357 of the recorder control relay 350 causes the simultaneous closure of each of its movable contacts 352, 354 and 356 upon the stationary contacts 351, 353 and 355, respectively. The closure of contact 352 upon contact 351 establishes a circuit from the negative terminal of the full-wave rectifier 304 through line 307 to vibrating reed contact 329, which is then closed against contact 327, and thence through line 333, through the coil of the vibrator relay 330, line 335, junction 338, line 339, contacts 351 and 352, line 359, junction 358, feeder $L_1$, junction 306 and line 305 to the positive terminal of the full-wave rectifier. The vibrator relay is hence energized and reed 329 begins to vibrate. As will be explained, this circuit through contacts 351—352 remains closed only a short time but reed 329 continues to vibrate for a period of time after the direct current circuit through the coil of relay 330 has been interrupted.

The vibration of reed 329 causes the energization of the slow release relay 315 through a circuit beginning at the positive terminal of the full-wave rectifier 304, through line 305, junction 306, feeder $L_1$, junction 319, line 318, junction 317, line 320, junction 321, thence through the coil of slow release relay 315, junction 324, line 325, to contact 326, which is in engagement with contact 327 when the latter is deflected due to the engagement of the vibrating reed contacts 329 thereon. The circuit thus extends through contact 326 and contact 327 to the vibrating reed 329 and thence through line 307 to the negative terminal of the full-wave rectifier 304. Direct current impulses are accordingly sent through the coil of slow release relay 315 so long as relay 330 vibrates, and the movable contact 316 of relay 315 accordingly engages stationary contact 314. The slow release relay contacts 314—316 remain closed for ¼-1 second after energization of the coil of the relay ceases, and while closed a circuit is maintained from alternating current feeder $L_1$ through line 318 to junction 317, thence through closed contacts 316 and 314, line 313, through the tape-drive motor 310 and line 311 to junction 312 of the alternating current feeder $L_2$. The energization of the tape-drive motor causes the rotation of the tape-drive roll 342 and the recording tape 344 is, therefore, rolled through the machine, either slowly or quickly, according to the design of the machine.

The energization of the recorder control relay 350 also establishes a circuit through the station recorder 370—1, corresponding to station No. 1, as follows: From the lower terminal of transformer secondary to junction 297, thence through line 295 to alternating current feeder $L_2$ to line 360, thence through junction 361, line 362, then closed contacts 355 and 356, line 363, through the coil of station recorder solenoid 370—1, and through line 298 to the upper terminal of the transformer secondary 296. The station recorder solenoid 370—1 causes its solenoid 372—1 to be drawn downwardly until the stylus point 373—1 is brought into engagement with the tape 344. This causes a dot impression to be formed on the tape, for the station recorder solenoid is immediately withdrawn due to the deenergization of recorder control relay 350, as will be explained.

The recorder control relay 350 remains energized until the trigger tube output circuit of its corresponding amplifier is broken, this being accomplished by energizing the reset relay 265 of the amplifier station through contacts 353—354 of relay 350 as follows: From alternating current feeder $L_2$ through line 360, junction 364, line 365, then closed contacts 353 and 354 to reset line $R_1$ which extends to the reset relay 265 of the photocell station amplifier for station No. 1 (Figure 5), thence through the relay 265 and through line 284 to alternating current feeder $L_1$. The energization of relay 265 causes contact 261 to be broken from contact 262, thus breaking the trigger tube output circuit through the signal relay 267 whereupon contact 280 of relay 267 moves out of engagement with its cooperating contact 281, accordingly de-energizing the recorder control relay 350 (of Figure 6). The entire sequence involves, initially, the energization of the signal relay 267, the consequent energization of recorder control relay 350 (which sets the vibrator relay 330 into operation, and thus causes the slow release to pick up and the tape drive motor to start together with the operation of the station recorder 370—1 of station No. 1) and the operation of the reset relay 265 which, as just explained, causes the de-energization of the signal relay 267 and the consequent opening of the circuit of the recorder control relay 350, all this occurring in such rapid succession that it is not audibly distinguishable. Therefore, a light impulse upon the photocell, if amplified, causes the operation of the relays in sequence, thus causing the marking of the tape and movement of the tape from the recorder apparatus. The tape motor continues to operate for ¼–1 second after the first impulse (and mark) is pressed upon the tape and thus moves the tape to a fresh position for the recording of successive impulses.

The operation of recorder control relay 380 at station No. 2 is exactly analogous to the operation of the relay at station No. 1. It will be noted that in this instance also the signal is received from the photocell station amplifier of station No. 2 by way of signal line $S_2$ which communicates the impulse to the coil of recorder control relay 380 for station No. 2. This causes the closure of movable contacts 382, 384 and 386 upon stationary contacts 381, 383 and 385, respectively. The closure of contact 382 upon contact 381 establishes a circuit to the vibrator control relay 330 in the same manner as that established by contacts 351 and 352 of relay 350, and the vibrator control relay in turn causes the operation of slow release relay 315 and the operation of tape drive motor 310. The closure of contact 384 upon contact 383 establishes a circuit to the reset relay 265 of the photocell station amplifier corresponding to station No. 2, and the latter in turn causes the de-energization of the trigger tube output circuit and consequent de-energization of the signal relay 267 of station No. 2, which in turn opens the circuit through the recorder control relay of station No. 2. The closure of contact 386 upon contact 385 establishes a circuit through the station recorder 370—2 corresponding to station No. 2 which operates the stylus 373—2 for marking the tape, this being exactly analogous to the operation discussed above which occurred when the contacts 355 and 356 are closed by the energization of relay 350 and station No. 1.

Thus, assuming that the illustrated system is utilized for the testing of projectiles, the movement of the projectile along path 11—12 of Figure 1 past station No. 1 will cause the photocells of station No. 1 to be activated, with consequent movement of stylus 373—1 corresponding to the station No. 1 into contact with tape 344. The movement of the projectile past station No. 2 will cause the photocells of station No. 2 to be activated, with consequent movement of stylus 373—2 corresponding to the station No. 2 recorder, into contact with tape 344. The movement of the projectiles will thus cause two dots to be marked upon the tape 344.

Where the tape-drive motor is arranged to move the tape relatively slowly, the two dots caused by stylus 373—1 and 373—2 will be nearly opposite each other because the tape, under such conditions will not move an appreciable distance during the time interval required for the movement of projectile from station 1 to station 2. The apparatus thus records the fact that the projectiles are moved past stations 1 and 2 and that a given condition of illumination of the projectile exists during the time of such movement. By designing the apparatus for rapid tape movement, the dots are spaced apart and a measure of the projectile velocity is afforded.

*Specific examples of photocell station amplifier constants*

For the purpose of further illustration, but without any intention of limiting the invention, reference is made to the following constants of one form photocell station amplifier which is useful for recording the performance of tracer bullets. It will be understood, of course, that other specific designs of the apparatus are equally within the purview of the invention and that this example must therefore be considered merely as illustrative:

| | | |
|---|---|---|
| Photo-electric cells: | | |
| First stage amplifier 206 | | 6SJ7 |
| Second stage amplifier 180 | | 6V6 |
| Trigger tube 240 | | 287A |
| Cold cathode tube 151 | | VR150 |
| Amplifier 160 | | 6SJ7 |
| Thermionic tube 125 | | 6B46 |
| Rectifiers 110 and 281 | | 5Z3 |
| Resistor 220 | megohms | 2 |
| Resistors 176 and 214 | do | 60 |
| Resistor 217 | do | 1 |
| Resistors 178, 138 and 146 | ohms | 10,000 |
| Resistor 196, 100 watts | do | 25,000 |
| Resistor 140 | do | 15,000 |
| Resistor 143 | do | 20,000 |
| Resistor 157 | do | 75,000 |
| Resistor 173 | megohm | ½ |
| Resistor 188 | ohms | 10,000 |
| Resistor 190 | do | 12,500 |
| Resistor 236 | do | 100,000 |
| Resistor 257 | do | 500 |
| Resistors 251 and 272 | do | 25,000 |
| Condensers 121, 123 (and the condensers of filter network 282) | microfarads | 8 |
| Condenser 258 | do | ½ |
| Condenser 212 | do | .00025 |

A photocell amplifier apparatus having the foregoing constants, when properly adjusted, is sufficiently sensitive to cause actuation of the signal relay 267 and consequent operation of the recorder when a piece of chalk or a yellow lead pencil is thrown through the photocell frame (Figure 2), and is unfailingly responsive to even the slightest illumination of a tracer bullet. Widely varying line voltage fluctuations do not cause false actuation of the signal relay 267.

It is also desirable to provide in the apparatus a bulb connected across the terminals of the recorder control relay for each station as illustrated at 390 and 391. In this way a visual indication of the operation of the apparatus is provided, in addition to the record made on the record tape.

Many obvious variations will occur to those skilled in the art. Thus, the apparatus may be utilized for recording the movement of packages past a given point, for the passage of very small objects through a restricted area, and for recording the performance of ammunition. These and other aspects of the invention are deemed to be within the purview of the invention illustrated, described and claimed as follows:

What we claim is:

1. An apparatus for recording the movement of an illuminated body comprising a plurality of photocell stations located at spaced intervals along the path of movement of said illuminating body, each station having a photocell, an amplifier and a signal relay connected to the photocell and responsive thereto, a plurality of recorder relays at a remote station connected, respectively, to said signal relays of the photocell stations, a record tape and record moving means, means connected to and responsive to each of the recorder relays and responsive to actuation of any of said recorder relays for causing the actuation of the record moving means when the first of said recorder relays is actuated and for continuing said actuation for a short time interval, and means responsive to each recorder relay when actuated for marking the record.

2. An apparatus for recording the movement of an illuminated body comprising a plurality of photocell stations located at intervals along the path of movement of such illuminated body each station having a photocell, an amplifier and a signal transmitting relay connected to the photocell and responsive thereto and capable of remaining energized until positively de-energized, a plurality of recorder relays at a remote station each being connected to one of the signal relays, a record tape and tape moving means, means connected to all of said recorder relays and responsive to and of said operation of the recorder relays for causing the actuation of the tape moving means and for continuing said movement for a short time interval, means connected to and responsive to energization of each recorder relay for marking the tape and means connected to and responsive to the operation of each recorder relay for de-energizing the signal transmitting relay to which it is responsive.

3. In an apparatus for recording the movement of an illuminated body past a plurality of stations located along the path of movement of said illuminated body, a photocell and amplifier therefor at each such station for transmitting an impulse responsive to the movement of the body past the station, a plurality of signal relays, one being connected to each amplifier so as to be energized thereby, a record and motor drive therefor, vibrator relay means connected to all of the signal relays and responsive to the first of them which is operated by a transmitted impulse from the photocell station amplifiers for initiating operation of the motor drive and maintaining said operation for a predetermined minimum period of time, a record connected to the motor drive so as to be driven thereby when the motor is operated and individual marking devices, one for each of the signal relays, said marking devices being located so as to mark the record when its signal relay is operated.

4. A device for recording the movement of an illuminated body comprising a plurality of photocell stations located along the path of movement of said body, a first relay means at each of said stations for transmitting a signal in response to the movement of the body past the station, said relay means being adapted to remain operated until open circuited, a plurality of individual electrically operated recorder elements, a record tape and a motor drive therefor, said tape being located so as to be marked by said recorder elements a plurality of second relay means one such relay means being connected to each of the first relay means and connected to one of the recorder elements, each of said second relay means being adapted upon receipt of a signal from its respective first relay means to operate the recording means and concurrently to open circuit its first relay means to which it is connected, and motor control means connected to all of said second relay means for initiating operation of said motor drive in response to the first of said record relay means which is energized, said motor control means including means for maintaining said motor in operation for a predetermined minimum period of time.

5. An apparatus for recording a series of instantaneous impulses of rapid sequence comprising a plurality of impulse generating means and a plurality of control relays connected, respectively, thereto and operable thereby, a plurality of recording means each being independently operable and each connected to one of the control relays, a record tape mechanically positioned so as to be marked by each of the recording means a motor drive for said tape, a vibrator relay connected to all of the control relays so as to be energized and set into vibration when any of said control relays is energized, said vibrator relay being capable of providing a plurality of circuit closures after being once energized, a slow release relay connected to said vibrator relay so as to be energized thereby and connected to said motor drive, said vibrator relay being adapted to maintain said slow release relay energized while said vibrator relay is in vibration, said vibrator relay having a duration of operable vibration of at least a predetermined minimum interval whereby an initial energization thereof when the first of said control relays is energized will energize said motor drive for a predetermined minimum period of time.

6. In an apparatus having a record and drive means therefor for recording electrical impulses of instantaneous duration comprising the combination of a signal circuit, a first relay energized when the signal circuit is energized, a vibrating reed relay energized by said first relay, a slow-release relay connected in circuit with the contracts of said vibrating reed relay whereby the slow release relay is energized by a series of impulses when the vibrating reed relay is set in motion responsive to the energization of said first relay, said drive means being connected to and controlled by said slow release relay, and means responsive to the operation of the first relay for interrupting the signal circuit.

HARRY WILLIAM HOFFMAN.
ESTHER HELEN HELMER,
*Special Administratrix of the Estate of Grover H. Helmer, Deceased.*

REFERENCES CITED

The following references are of record in the file of this patent:

UNITED STATES PATENTS

| Number | Name | Date |
|---|---|---|
| 1,196,335 | Clokey | Aug. 29, 1916 |
| 1,555,893 | Thompson | Oct. 6, 1925 |
| 1,985,563 | Fitz Gerald | Dec. 25, 1934 |
| 2,176,312 | Rassow | Oct. 17, 1939 |
| 2,252,525 | Reid et al. | Aug. 12, 1941 |
| 2,265,512 | Brown et al. | Dec. 9, 1941 |
| 2,275,368 | Krouse | Mar. 3, 1942 |
| 2,294,730 | Eggers | Sept. 1, 1942 |
| 2,333,210 | Stern | Nov. 2, 1943 |
| 2,362,473 | Dunham | Nov. 14, 1944 |
| 2,369,659 | Carr | Feb. 20, 1945 |
| 2,387,544 | Usselman | Oct. 23, 1945 |
| 2,418,137 | Noell | Apr. 1, 1947 |
| 2,430,810 | Fowler | Nov. 11, 1947 |

FOREIGN PATENTS

| Number | Country | Date |
|---|---|---|
| 562,461 | Great Britain | July 3, 1944 |